(12) United States Patent
Bialy (10) Patent No.: US 11,806,888 B2
(45) Date of Patent: *Nov. 7, 2023

(54) CONVEYOR SYSTEM FOR CONVEYING FOOD PRODUCTS AND ASSOCIATED OPERATING METHOD

(71) Applicant: Provisur Technologies, Inc., Chicago, IL (US)

(72) Inventor: Jürgen Bialy, Oeschebüttel (DE)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,217

(22) Filed: Aug. 8, 2022

(65) Prior Publication Data

US 2022/0380149 A1 Dec. 1, 2022

Related U.S. Application Data

(63) Continuation of application No. 16/967,977, filed as application No. PCT/EP2019/052401 on Jan. 31, 2019, now Pat. No. 11,407,137.

(30) Foreign Application Priority Data

Feb. 9, 2018 (DE) ...................... 10 2018 102 919.5

(51) Int. Cl.
*B26D 7/32* (2006.01)
*B65B 25/06* (2006.01)
(Continued)

(52) U.S. Cl.
CPC .............. *B26D 7/32* (2013.01); *B65B 25/065* (2013.01); *B65B 25/068* (2013.01); *B65B 35/44* (2013.01);
(Continued)

(58) Field of Classification Search
CPC ....... B26D 7/32; B65B 25/065; B65B 25/068; B65B 35/44; B65B 35/52; B65G 43/08;
(Continued)

(56) References Cited

U.S. PATENT DOCUMENTS 4,846,336 A 7/1989 Hoyland et al.
6,763,750 B2 7/2004 Lindee
(Continued)

FOREIGN PATENT DOCUMENTS

DE 3642123 A1 6/1988
DE 102014002530 A1 8/2015
(Continued)

OTHER PUBLICATIONS

German International Search Report and Written Opinion with translation issued in International Patent Application No. PCT/EP2019/052401 dated Apr. 16, 2019.
(Continued)

*Primary Examiner* — Lynn E Schwenning
(74) *Attorney, Agent, or Firm* — KLINTWORTH & ROZENBLAT IP LLP (57) ABSTRACT

The invention concerns a conveyor system for formatting slice-shaped food products in product stacks. The conveyor system includes an inlet, a lower product conveyor, an upper product conveyor, a vertically swiveling distributor conveyor for distributing the incoming food products selectively to the lower product conveyor or to the upper product conveyor, an output conveyor receiving the food products partially stacked from the lower product conveyor and the upper product conveyor, and an outlet for outputting the stacked food products in product rows. The individual conveying tracks of the distributor conveyor can be swivelled vertically independently of one another in order to forward the incoming food products individually for each
(Continued)

conveying track selectively to the lower product conveyor onto the upper product conveyor.

12 Claims, 5 Drawing Sheets

(51) Int. Cl.
    *B65B 35/44*     (2006.01)
    *B65B 35/52*     (2006.01)
    *B65G 43/08*     (2006.01)
    *B65G 47/08*     (2006.01)
    *B65G 47/64*     (2006.01)
    *B65G 47/68*     (2006.01)
    *B65G 57/32*     (2006.01)

(52) U.S. Cl.
    CPC .............. *B65B 35/52* (2013.01); *B65G 43/08* (2013.01); *B65G 47/084* (2013.01); *B65G 47/642* (2013.01); *B65G 47/681* (2013.01); *B65G 57/32* (2013.01); *B26D 2210/02* (2013.01); *B65G 2201/0202* (2013.01); *B65G 2201/022* (2013.01)

(58) Field of Classification Search
    CPC ... B65G 47/084; B65G 47/642; B65G 47/681
    See application file for complete search history.

(56) References Cited

U.S. PATENT DOCUMENTS

| | | | |
|---|---|---|---|
| 11,407,137 B2* | 8/2022 | Bialy | .................... B65B 35/44 |
| 2012/0031682 A1 | 2/2012 | Weber | |
| 2013/0319817 A1 | 12/2013 | Gahler | |
| 2014/0299447 A1 | 10/2014 | Bauer | |
| 2016/0272440 A1* | 9/2016 | Mayer | .................... B65G 15/50 |

FOREIGN PATENT DOCUMENTS

| | | | |
|---|---|---|---|
| DE | 102018102919 B3 | 3/2019 | |
| EP | 2030898 B1 | 3/2009 | |
| EP | 2416129 A1 | 7/2011 | |
| EP | 2479111 A2 | 7/2012 | |
| EP | 2669221 A1 | 5/2013 | |
| EP | 2789538 A1 | 2/2014 | |
| EP | 2878556 A1 | 10/2014 | |
| EP | 3069836 A1 | 9/2016 | |
| WO | 9823510 A1 | 6/1998 | |

OTHER PUBLICATIONS

Textor, YouTube-Video, Cheese Variety Pack Slicing Line—"Smart, easy and flexible", https://www.youtube.com/watch?v=FTwRHOAftnA, Dec. 9, 2017. (2 pages).

Textor, YouTube-Video, SmartOverlapper—"Smartloader, overlapped deli meat application", https://www.youtube.com/watch?v=efUI9XZXNL4, Feb. 15, 2017. (2 pages).

DPMA Direkt, Montageanleitung fur PortionsUberlapper CCO, Weber Maschinenbau GmBH & Co KG, 903, veroffentlicht am Apr. 5, 2005. (104 pages).

* cited by examiner

CONVEYOR SYSTEM FOR CONVEYING FOOD PRODUCTS AND ASSOCIATED OPERATING METHOD

CROSS-REFERENCE TO RELATED APPLICATIONS

This application is a continuation application of, and claims priority to, U.S. application Ser. No. 16/967,977, filed Aug. 6, 2020. U.S. application Ser. No. 16/967,977 is the National Stage of International Application No. PCT/EP2019/052401, filed Jan. 31, 2019. International Application No. PCT/EP2019/052401 claims priority to DE 10 2018 102 919.5, filed Feb. 9, 2018. Each of the above-referenced applications is hereby incorporated by reference.

FIELD OF THE DISCLOSURE

The invention concerns a conveyor system for conveying food products (e.g., sausage slices, cheese slices) and for formatting the food products in product stacks. Furthermore, the invention concerns a corresponding operating method.

BACKGROUND

From DE 10 2014 002 530 A1, a similar conveyor system is known, which however has the aim of filling product gaps in the incoming conveying tracks. However, similar machines are also known for stacking food products (e.g., sausage slices, cheese slices).

The well-known machines for stacking food products (e.g., sausage slices, cheese slices) are, however, not yet sufficiently flexible with regard to the formatting of the incoming food products in the desired product format.

SUMMARY OF THE DISCLOSURE

The invention is therefore based on the task of creating a correspondingly improved conveyor system and an associated operating method.

This task is solved by a conveyor system according to the invention or a corresponding operating method according to the independent claims.

In accordance with the state of the art, the conveying system according to the invention initially has an inlet to receive the food products (e.g., sausage slices, cheese slices) in rows of products which are aligned transversely to the conveying direction and each contain several food products in parallel conveying tracks.

In a preferred embodiment of the invention, the conveyor is preceded by a product slicing device ("slicer"), which slices the food products (e.g., large pieces of ham, blocks of cheese) into slices and then feeds these to the conveyor system according to the invention for formatting and stacking.

In addition, in accordance with the state of the art, the conveyor system according to the invention has a distributor conveyor which receives the food products (e.g., sausage slices, cheese slices) from the inlet of the conveyor system and, depending on its swiveling position, transfers them either to an upper product conveyor or to a lower product conveyor. The upper product conveyor and the lower product conveyor are arranged one above the other and are fed by the swiveling distributor conveyor with the incoming food products (e.g., sausage slices, cheese slices), whereby the swiveling position of the distributor conveyor determines to which of the two product conveyors arranged one above the other the incoming food products are forwarded.

It has already been briefly mentioned above that the conveyor system according to the invention allows the stacking of the incoming food products (e.g., slices of sausage, cheese). For example, the individual product stacks can each contain two slices if two product conveyors are arranged one above the other. However, it is also possible that the individual product stacks contain a larger number of slices at the outlet, which then requires a correspondingly larger number of product conveyors arranged one above the other. When formatting in product stacks with three superimposed slices, three superimposed product conveyors are then required, which are loaded by the swiveling distributor conveyor with the incoming food products (e.g., sausage slices, cheese slices).

In addition, in accordance with the state of the art, the conveyor system according to the invention comprises an output conveyor which takes over the food products from the lower product conveyor and the upper product conveyor partially stacked. The upper product conveyor thus places the food products on the food products which are conveyed by the lower product conveyor, resulting in a corresponding stacking.

It should be noted that the term 'stack of products' used in the context of the invention is to be understood in general terms. For example, the individual slices of the product stack can be stacked on top of each other with one hundred percent overlap, i.e. the individual slices in the product stack lie congruently on top of each other. However, within the scope of the invention there is also the possibility that the superimposed slices are staggered, so that the overlapping of the superimposed slices within the product stack is only partial. In addition, the product stacks can also be shingled, as is known from the state of the art.

The output conveyor then delivers the food products formatted in product stacks (e.g., sausage slices, cheese slices) to an outlet, where the stacked food products are outputted again in product rows, whereby the product rows are aligned transversely to the conveying direction and each contain several food products in parallel tracks as product stacks.

The conveyor system according to the invention is now characterized by the fact that the individual conveyor tracks of the distributor conveyor can be swivelled vertically independently of one another in order to forward the incoming food products individually for each conveyor track either to the lower product conveyor or to the upper product conveyor. In contrast, the distributor conveyor of the conventional conveyor system according to DE 10 2014 002 530 A1 can only be swivelled upwards or downwards as a whole with all conveyor tracks. The individual track swiveling of the individual conveyor tracks of the distributor conveyor advantageously increases the flexibility in the formatting and stacking of the incoming food products (e.g., sausage slices, cheese slices). In this way, for example, it is possible to format eight incoming conveyor tracks with food products into four outgoing conveyor tracks, each containing a product stack with two slices.

Preferably, all conveyor tracks of the distributor conveyor can be swivelled independently and individually upwards or downwards. Alternatively, however, it is also possible to swivel the conveyor tracks of the distributor conveyor upwards or downwards in groups. For example, the distributor conveyor can have two swivel parts which can be swivelled upwards or downwards independently of each other and which each comprise two conveyor tracks. However, instead of such a symmetrical 2:2 division of the distributor conveyor, asymmetrical divisions of the distributor conveyor are also possible, for example with a single conveyor track in one swivel part of the distributor conveyor and three conveyor tracks in the other swivel part of the distributor conveyor. In addition, it is also possible for the distributor conveyor to have more than two swivel parts which can be swivelled upwards or downwards independently of each other. In the preferred embodiment of the invention, however, the number of independently swivelable swivel parts of the distributor conveyor is equal to the number of conveyor tracks of the distributor conveyor, which allows maximum flexibility.

It should also be mentioned that preferably at least one of the product conveyors arranged one above the other is a so-called shuttle conveyor, which can be moved transversely to the conveying direction. For example, only the upper product conveyor can be such a shuttle conveyor. Alternatively, it is also possible that only the lower product conveyor is such a shuttle conveyor. In addition, it is also possible that all product conveyors are designed as shuttle conveyors, which leads to greater complexity. The lateral movement of the shuttle conveyor makes it possible to align the incoming food products side by side for subsequent stacking with the desired overlap. If, for example, eight conveyor tracks with food products come in at the inlet side, while four conveyor tracks with product stacks leave at the outlet side, the food products coming in at the inlet side must be brought together in pairs to form product stacks. This presupposes that a food product of the respective pair is moved laterally by the shuttle conveyor so that the two food products of the respective pair can be stacked.

In the preferred embodiment of the invention, the shuttle conveyor allows a maximum lateral offset that corresponds exactly to one conveyor track. However, it is also possible within the scope of the invention that the shuttle conveyor allows a lateral offset which comprises several conveyor tracks.

In the preferred embodiment of the invention, the conveyor system allows two modes of operation, which are set as a function of the number of the incoming conveying tracks and the number of the outgoing conveying tracks, the operating mode being selected and specified by a control unit 14 (depicted schematically in FIG. 4A) which also controls the distributor conveyor, as described in detail below.

The control unit 14 sets a first operating mode when the number of food products in the incoming product rows is twice as large as the number of food products in the outgoing product rows. This is the case, for example, if the incoming product rows each contain eight slices of food next to each other, while the outgoing product rows each contain four product stacks with two slices each.

In this first operating mode, the control unit 14 controls the distributor conveyor in such a way that the individual swivel parts of the distributor conveyor are swivelled individually for the individual conveyor tracks either upwards to the upper product conveyor or downwards to the lower product conveyor. The even-numbered swivel parts of the distributor conveyor are preferably swivelled upwards, while the odd-numbered swivel parts of the distributor conveyor are swivelled downwards. Conversely, it is also possible that the even-numbered swivel parts of the distributor conveyor are swivelled downwards while the odd-numbered swivel parts of the distributor conveyor are swivelled upwards. The only decisive factor here is that the swivel parts of the distributor conveyor are swivelled upwards and downwards alternately transverse to the conveying direction.

Furthermore, in this first operating mode, the control unit 14 controls the shuttle conveyor in such a way that the food products on the shuttle conveyor are shifted sideways in order to enable the desired lateral overlapping with the food products on the other product conveyor, as this is the only way to stack the food products. For example, the shuttle conveyor can move the food products by exactly one track if a complete overlap of the stacked food products is required. However, it is also possible, for example, that the shuttle conveyor moves the food products laterally by only half a conveyor track if only fifty percent coverage of the slices in the product stack is desired.

For example, the odd-numbered food products (i.e. the food products at 1st, 3rd, 5th, 7th, . . . positions) in the individual product rows can then be conveyed upwards, while the even-numbered food products (i.e. the food products at 2nd, 4th, 6th, 8th, . . . positions) in the individual product rows can be conveyed downwards. The even-numbered food products of the individual product rows are then stacked with the odd numbered food products of the individual product rows in product stacks of two slices each.

It should be mentioned here that in the first operating mode, the swivel position of the individual swivel parts of the distributor conveyor is not changed dynamically, but is maintained during the first operating mode. It is therefore not necessary to change the swivel position of the distributor conveyor dynamically in the first operating mode.

In addition, the conveyor system according to the invention enables a second operating mode, which is set by the control system if the number of food products in the incoming product rows is equal to the number of food products in the outgoing product rows. This is the case, for example, when the incoming product rows each contain four food products, while the outgoing product rows each contain four product stacks with two slices stacked on top of each other.

In this second operating mode, the control unit 14 controls the distributor conveyor in such a way that all swivel parts of the distributor conveyor with all conveyor tracks are swivelled together either upwards to the upper product conveyor or downwards to the lower product conveyor.

The swiveling position of the distributor conveyor is dynamically changed during operation. Preferably, the product rows arriving at the input side are guided alternately upwards by the distributor conveyor to the upper product conveyor and downwards to the lower product conveyor. The product rows on the upper product conveyor are then stacked onto the product rows from the lower product conveyor.

On the one hand, in the second operating mode this leads to a halving of the cycle rate from the input side of the conveyor to the output side of the conveyor, i.e., the pickup rate of the individual product rows at the input side is twice as high as the output rate of the product rows at the output side, since two product rows are combined to form a stacked product row.

On the other hand, this also means that in this second operating mode no lateral displacement by means of the shuttle conveyor is required if a complete covering of the individual slices in the finished product stack is desired. If, on the other hand, a fifty percent overlapping of the individual slices in the finished product stack is desired, the shuttle conveyor must be moved sideways by half a conveyor track in this operating mode in order to achieve the desired overlapping.

It should also be mentioned that the conveyor system according to the invention can be designed as a stand-alone device, which enables subsequent integration into existing processing lines. Alternatively, however, it is also possible to integrate the conveyor system according to the invention into another device (e.g., product slicing machine, loader).

In addition to the conveyor system according to the invention described above, the invention also claims protection for a corresponding operating method, whereby the individual steps of the operating method according to the invention already result from the above description of the function of the conveyor system, so that a separate description of the individual steps of the operating method can be dispensed with.

BRIEF DESCRIPTION OF THE DRAWINGS

Other advantageous further modifications of the invention are indicated in the dependent claims or explained in more detail below together with the description of the preferred embodiment of the invention using the figures. They show:

DETAILED DESCRIPTION

Figure 1:
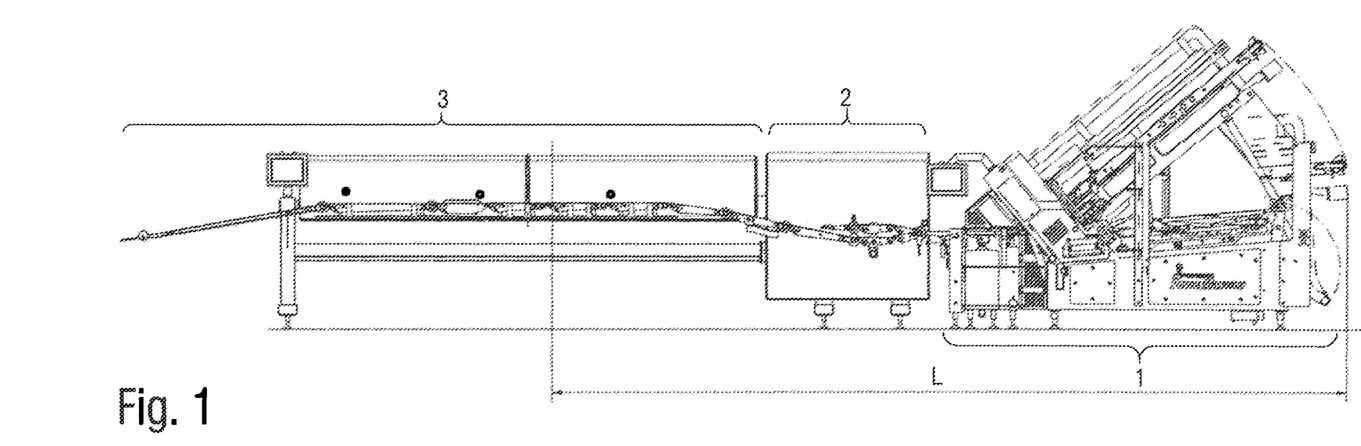
FIG. 1 is a side view of a processing line according to the invention for processing meat products with a product slicing machine, a conveyor system according to the invention and a loader.
Figure 2:
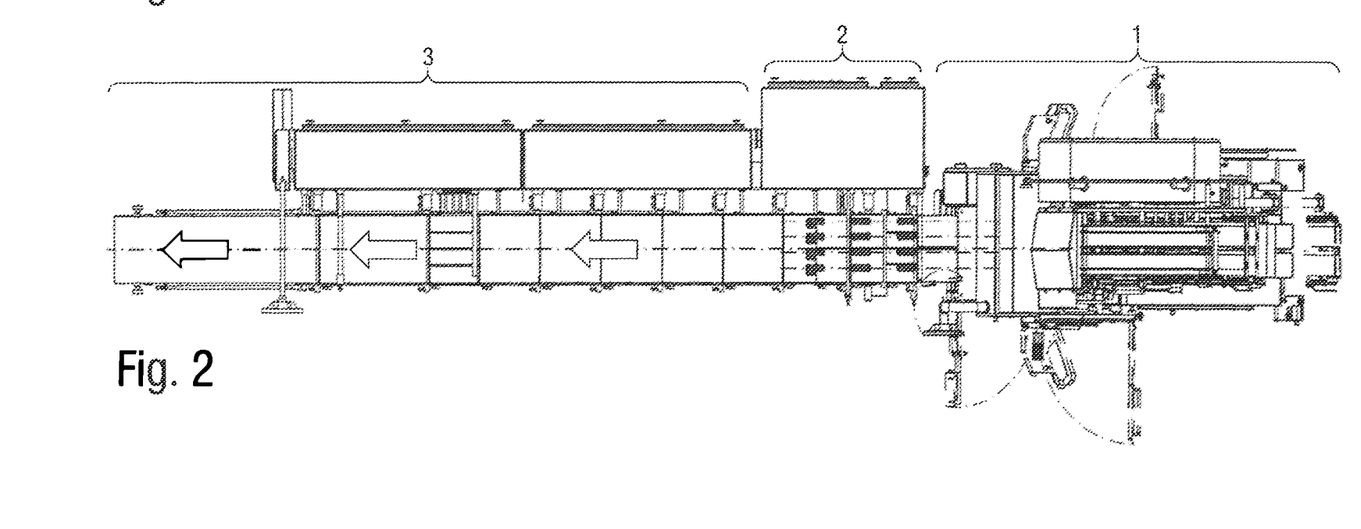
FIG. 2 shows an overview of the processing line according to FIG. 1.

FIGS. 1 and 2 show different views of a processing line for processing food products (e.g., sausage, cheese).

The processing line initially has a product slicing machine 1, which is also referred to as a "slicer" and can be of conventional design. An example of the design and operation of the product slicing machine I is described in U.S. Pat. No. 6,763,750 B2.

The product slicing machine I delivers product rows of food slices (e.g., sausage slices, cheese slices) to a downstream conveyor system 2, which formats and stacks the food product slices as described in detail below.

The conveyor system 2 then delivers the product stacks to a downstream loader 3, which can also be conventionally constructed, with an embodiment of the construction and operation of the loader 3 described in EP 2 030 898 B1.

Figure 3:
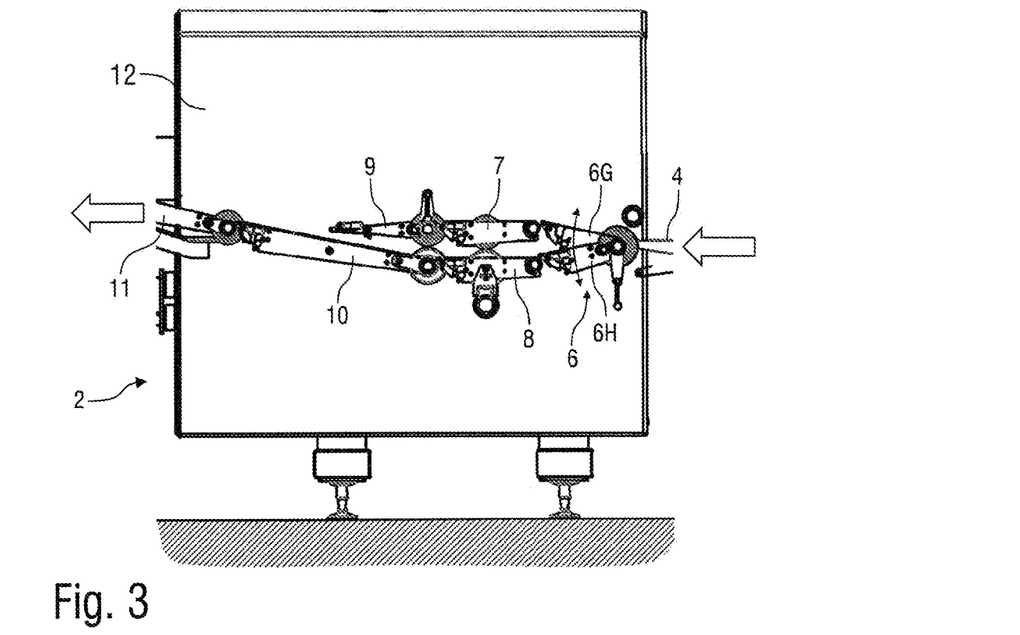
FIG. 3 is a side view of the conveyor system according to the invention from FIGS. 1 and 2.

The invention essentially concerns the design and function of the conveyor system 2, which is shown in detail in FIG. 3 and described below.

Firstly, the conveyor system 2 has an inlet 4, which can be formed by an output conveyor of the product slicing machine 1. At the inlet 4, the conveyor system 2 takes up product rows, each of which is aligned transversely to the conveying direction and each of which contains several food products 5 in parallel conveying tracks. It should be mentioned here that the conveying direction is shown in the drawings by block arrows.

Furthermore, the conveyor system 2 comprises a distributor conveyor 6, which takes over and distributes the incoming food products 5. It should be mentioned here that the distributor conveyor 6 comprises a total of eight swivel parts 6A-6H, which can be swivelled upwards or downwards independently of each other and each comprise a conveyor track for one of the food products 5. In this embodiment, the distributor conveyor 6 thus has a total of eight conveyor tracks A1, A2, B1, B2, C1, C2, D1, D2, so that each product row at the inlet 4 of the conveyor system 2 can comprise a total of eight of the food products 5.

In the conveying direction behind the distributor conveyor 6, an upper product conveyor 7 and a lower shuttle conveyor 8 are arranged one above the other. The individual swivel parts 6A-6H of the distributor conveyor 6 can guide the incoming food products 5 on the input side either upwards to the upper product conveyor 7 or downwards to the lower shuttle conveyor 8, as described in detail below.

In the conveying direction behind the upper product conveyor 7 there is an upper transfer conveyor 9, while in the conveying direction behind the lower shuttle conveyor 8 there is an output conveyor 10. The upper transfer conveyor 9 can then place the food products 5 on the food products 5 on the output conveyor IO and thereby create product stacks 13 with two slices each.

The conveyor system 2 also has an outlet 11, which can be formed, for example, by a conveyor of the downstream loader 3 and is fed by the output conveyor 10.

It should also be mentioned that the lower shuttle conveyor 8 can be moved laterally to the conveying direction in order to align the food products 5 laterally (i.e., transversely to the conveying direction) for subsequent stacking, as is described in detail below. The lateral movement of the shuttle conveyor 8 is known from the state of the art and is controlled by a control unit which is arranged in a housing 12 of the conveyor system 2.

The conveyor system 2 allows two different operating modes, which are selected as a function of the number of incoming conveyor tracks and as a function of the number of outgoing conveyor tracks.

Figure 4A:
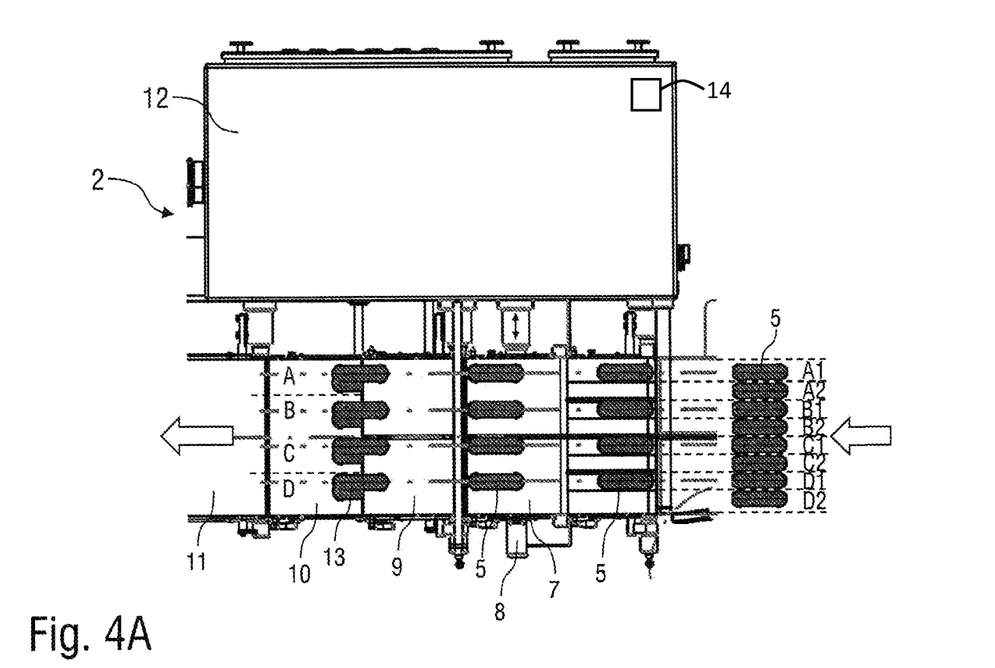
FIG. 4A is a top view of the conveyor system according to the invention according to FIG. 3 in a first operating mode.
Figure 6A:
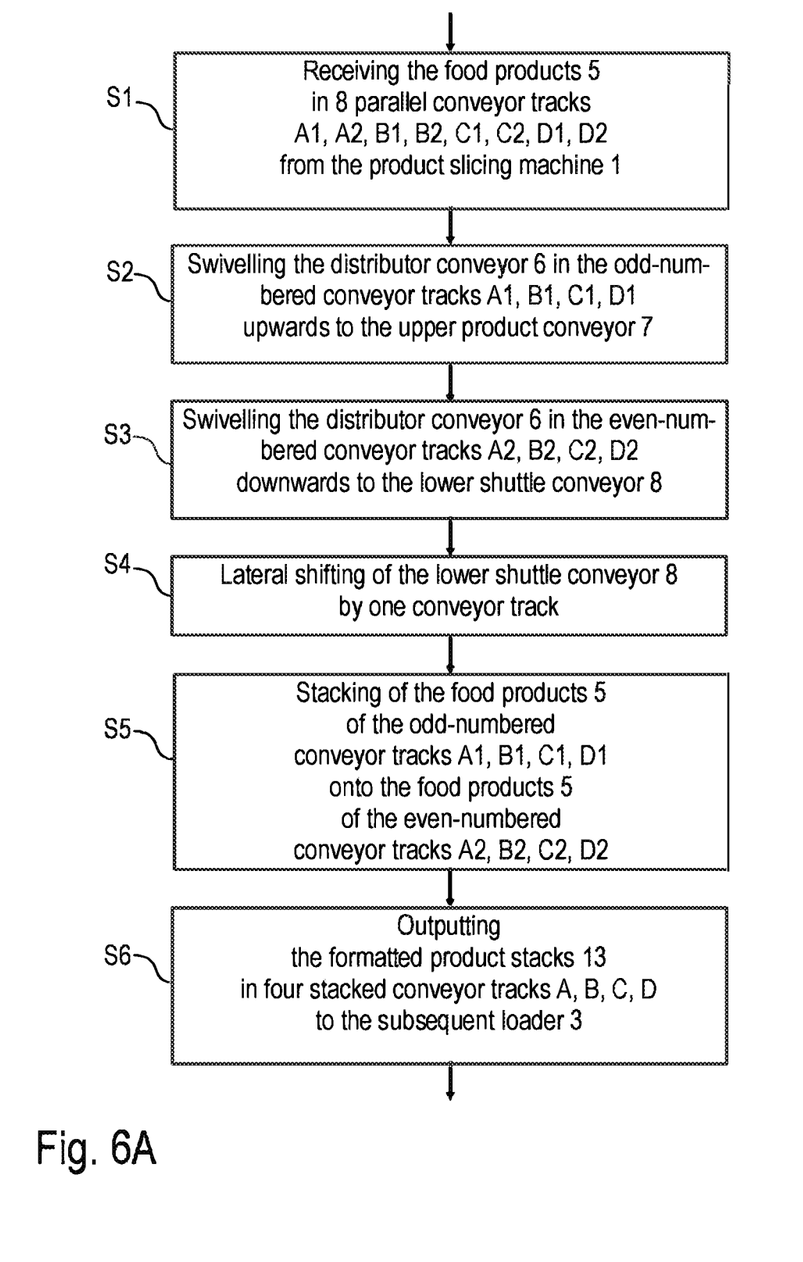
FIG. 6A is a flow chart to illustrate the first operating mode according to FIG. 4A, as well as FIG. 6B is a flow chart to illustrate the second operating mode according to FIG. 4B.

FIGS. 4A and 6A show a first operating mode with eight incoming conveying tracks A1, A2, B1, B2, C1, C2, D1, D2 and four outgoing conveying tracks A-D.

Figure 4B:
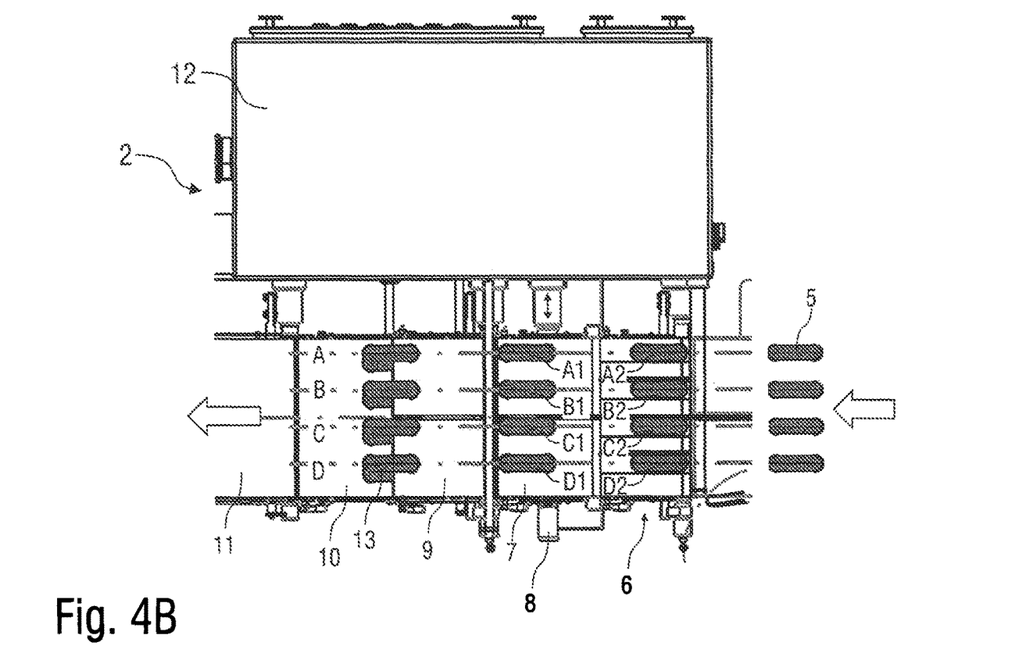
FIG. 4B is a top view of the conveyor system according to the invention according to FIG. 3 in a second operating mode.
Figure 5:
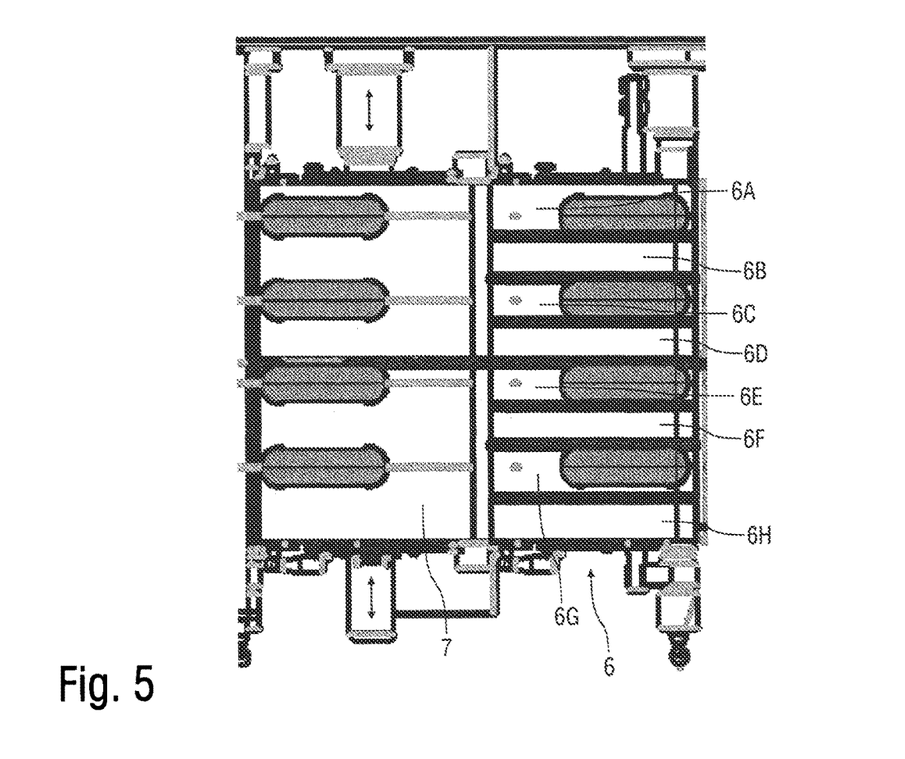
FIG. 5 is a detail enlargement from FIG. 4B.
Figure 6B:
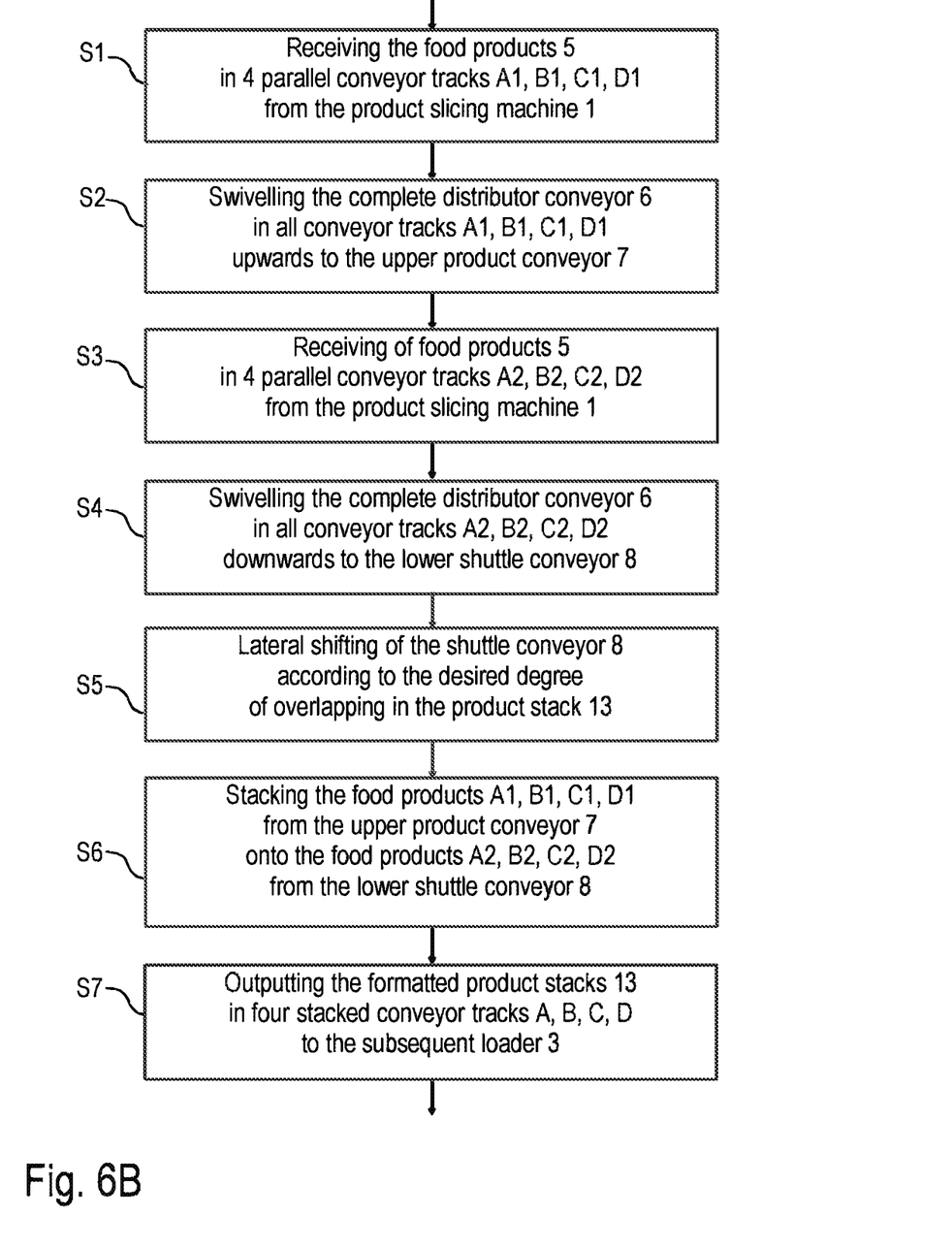

FIGS. 4B and 6B, on the other hand, illustrate a second operating mode with four conveyor tracks A-D entering on the input side and four conveyor tracks A-D leaving on the output side.

In the following, with reference to FIGS. 4A and 6A, the first operating mode is described, in which the number of incoming conveyor tracks (eight) is twice as large as the number of outgoing conveyor tracks (four).

In this first operating mode, eight parallel conveyor tracks A1-D2 of the food products 5 are received on the input side in a step S1.

In steps S2, S3, the individual swivel parts 6A-6H of the distributor conveyor 6 are swivelled alternately upwards to the upper product conveyor 7 or downwards to the lower shuttle conveyor 8 in transverse direction to the conveying direction. This means that the incoming food products 5 are guided upwards and downwards alternately along each product row.

In a step S4, the shuttle conveyor 8 then moves the food products 5 on the lower shuttle conveyor 8 in a lateral direction transverse to the conveying direction by approximately one conveyor track, in order to then enable the desired overlapping of the food products 5 in the individual product stacks.

In a step S5 the transfer conveyor 9 then stacks the food products 5 from the odd-numbered conveyor tracks A1-D1 onto the food products 5 from the even-numbered conveyor tracks A2-D2.

The product stacks 13 with two slices each are then discharged at the outlet 11, whereby each product row at the outlet 11 comprises four product stacks 13 with two slices each.

The second operating mode of the conveyor system 2 is described below with reference to FIGS. 4B and 6B. In this second operating mode, a first product row with four food products 5 from four parallel conveyor tracks A1-D1 is first taken up in a step S1.

In a step S2, the complete distributor conveyor 6 with all its swivel parts 6A-6H then swivels upwards to the upper product conveyor 7, which thus takes up the first product row completely.

In a further step S3, another product row of food products is then picked up in four parallel conveyor tracks A2-D2.

The complete distributor conveyor 6 with all its swivel parts 6A-6H is then swivelled downwards in a step S4 to the lower shuttle conveyor 8, which thus picks up the second product row completely.

In a step S5, the shuttle conveyor 8 can then be moved sideways to align the food products on the lower shuttle conveyor 8 sideways with respect to the food products on the upper product conveyor 7.

If one hundred percent overlapping of the stacked slices is desired in the product stacks 13, the shuttle conveyor 8 does not have to be moved sideways at all.

If, on the other hand, a fifty percent overlapping of the stacked slices is desired in the product stacks 13, the shuttle conveyor 8 must be shifted by half a conveyor track in a lateral direction.

The lateral displacement path of the shuttle conveyor 8 thus depends on the desired coverage of the slices in the finished product stack.

In a step S6, the food products 5 from the upper product conveyor 7 are stacked onto the food products 5 from the lower shuttle conveyor 8.

Product rows each with four product stacks 13 are then outputted at the outlet 11 (step S7).

The invention is not limited to the preferred embodiment described above. Rather, a large number of modifications and variations are possible which also make use of the inventive idea and therefore fall within the scope of protection. In particular, the invention also claims protection for the subject matter and the characteristics of the dependent claims, irrespective of the claims referred to in each case and in particular also without the features of the main claim. The invention thus comprises various aspects which enjoy protection independently of each other.

REFERENCE CHARACTER LIST

1 Product slicing machine
2 Conveyor system
3 Inlet
4 Inlet of the conveyor system
5 Food products
6 Distributor conveyor
6A-6H Swivel parts of the distributor conveyor
7 Upper product conveyor
8 Lower shuttle conveyors
9 Upper transfer conveyor
10 Output conveyor
11 Outlet
12 Housing of the conveyor system
13 Product stacks
A-D Output-side conveyor tracks
A1-D2 Input-side conveyor tracks

What is claimed is:

1. A conveyor system for conveying and formatting food products into product stacks, the conveyor system comprising:
    an inlet for receiving the food products in product rows arranged parallel to one another and transversely to a conveying direction;
    a lower product conveyor arranged to receive and to convey a first portion of the food products in the conveying direction;
    an upper product conveyor arranged to receive and to convey a second portion of the food products in the conveying direction, wherein the upper product conveyor is arranged above the lower product conveyor, wherein at least one of the upper product conveyor and the lower product conveyor is a shuttle conveyor configured to selectively move transversely to the conveying direction;
    a distributor conveyor comprising incoming conveying tracks, each configured to receive a respective food product of each product row, wherein each of the incoming conveyor tracks of the distributor conveyor is configured to independently vertically swivel between
        a first swivel position in which the food products thereon are directed to the lower product conveyor as the first portion of the food products, and
        a second swivel position in which the food products thereon are directed to the upper product conveyor as the second portion of the food products,
    wherein, in a first operating mode, a first set of the incoming conveying tracks are positioned into the first swivel position and a second set of the incoming conveying tracks are positioned into the second swivel position, and
    wherein, in a second operating mode, collectively all of the incoming conveying tracks are positioned into the first swivel position or collectively all of the incoming conveying tracks are positioned into the second swivel position;
    an output conveyor comprising outgoing conveying tracks arranged to receive the first portion of the food products from the lower product conveyor and the second portion of the food products from the upper product conveyor such that the second portion of the food products are at least at least partially stacked on the first portion of the food products; and
    an outlet arranged downstream of the output conveyor to receive and output the second portion of the food products at least partially stacked on the first portion of the food products as the product stacks.

2. The conveyor system of claim 1, further comprising a control unit coupled to command the incoming conveying tracks of the distributor conveyor between the first swivel position and the second swivel position at least partially based on a collective quantity of incoming conveying tracks relative to a collective quantity of outgoing conveying tracks.

3. The conveyor system of claim 2,
    wherein the control unit is configured to operate in the first operating mode when the collective quantity of incoming conveying tracks is greater than the collective quantity of outgoing conveying tracks, and wherein the control unit, in the first operating mode, is configured to command the first set of the incoming conveying tracks into the first swivel position and to command a second set of the incoming conveying tracks into the second swivel position.

4. The conveyor system of claim 3, wherein the control unit is configured to operate in the first operating mode when the collective quantity of incoming conveying tracks is twice that of the collective quantity of outgoing conveying tracks.

5. The conveyor system of claim 3, wherein the control unit, in the first operating mode, is further configured to command the shuttle conveyor to laterally align the food products on the upper product conveyor and the food products on the lower product conveyor for stacking.

6. The conveyor system of claim 3, wherein the control unit, in the first operating mode, is configured to maintain the first set of the incoming conveying tracks in the first swivel position and to maintain the second set of the incoming conveying tracks in the second swivel position.

7. The conveyor system of claim 3, wherein the control unit, in the first operating mode, is configured to command the incoming conveying tracks of the distributor conveyor such that the incoming conveying tracks of the first set of the incoming conveying tracks are interleaved with the incoming conveying tracks of the second set of the incoming conveying tracks.

8. The conveyor system of claim 3,
wherein the control unit is configured to operate in the second operating mode when the collective quantity of incoming conveying tracks is equal to the collective quantity of outgoing conveying tracks, and wherein the control unit, in the second operating mode, is configured to command collectively all of the incoming conveying tracks into the first swivel position or collectively all of the incoming conveying tracks into the second swivel position.

9. The conveyor system of claim 8, wherein the control unit, in the second operating mode, is configured to alternately command collectively all of the incoming conveying tracks between the first swivel position and the second swivel position.

10. A method for operating a conveyor system for conveying and stacking food products, the method comprising:
receiving food products from an input in product rows arranged parallel to one another at a distribution conveyor with incoming conveying tracks, each configured to independently swivel downward as a first swivel position and upward as a second swivel position;

comparing a collective quantity of incoming conveying tracks to a collective quantity of outgoing conveying tracks;

operating in a first operating mode when the collective quantity of incoming conveying tracks is greater than the collective quantity of outgoing conveying tracks;

operating in a second operating mode when the collective quantity of incoming conveying tracks is equal to the collective quantity of outgoing conveying tracks;

selectively distributing, according to the selected first or second operating mode, a first portion of the food products on the distribution conveyor to a lower product conveyor by positioning the one or more of the incoming conveying tracks into the first swivel position;

selectively distributing, according to the selected first or second operating mode, a second portion of the food products on the distribution conveyor to an upper product conveyor by positioning the one or more of the incoming conveying tracks into the second swivel position;

conveying the first portion of food products from the lower product conveyor onto outgoing conveying tracks of an output conveyor and stacking the second portion of food products from the upper product conveyor onto the first portion of food products on the output conveyor to form stacked food products; and outputting the stacked food products on the output conveyor from the conveyor system at an output.

11. The method of claim 10,
wherein, in the first operating mode, a first set of the incoming conveying tracks are placed in the first swivel position simultaneously when a second set of incoming conveying tracks are placed in the second swivel position, and wherein, in the second operating mode, all of the incoming conveying tracks are alternately and collectively positioned between the first swivel position and the second swivel position.

12. The method of claim 11, further comprising displacing, when operating in the second operating mode, the upper product conveyor relative to the lower product conveyor by a lateral offset selected as a function of lateral coverage of the food products.

* * * * *